(12) United States Patent
Schwartz et al.

(10) Patent No.: US 9,047,576 B2
(45) Date of Patent: Jun. 2, 2015

(54) MECHANISM TO COMMUNICATE AND VISUALIZE DEPENDENCIES BETWEEN A LARGE NUMBER OF FLOWS IN SOFTWARE

(75) Inventors: Daniel Schwartz, San Francisco, CA (US); Arin Bhowmick, Fremont, CA (US); Harris Kravatz, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 543 days.

(21) Appl. No.: 12/852,719

(22) Filed: Aug. 9, 2010

(65) Prior Publication Data

US 2012/0036462 A1 Feb. 9, 2012

(51) Int. Cl.
*G06F 3/048* (2013.01)
*G06Q 10/06* (2012.01)
*G06F 9/44* (2006.01)

(52) U.S. Cl.
CPC . *G06Q 10/06* (2013.01); *G06F 8/10* (2013.01)

(58) Field of Classification Search
USPC .......................................................... 715/771
See application file for complete search history.

(56) References Cited

U.S. PATENT DOCUMENTS

| | | | | |
|---|---|---|---|---|
| 5,995,940 | A * | 11/1999 | Ramaley | 705/7.12 |
| 2007/0244736 | A1* | 10/2007 | Johnson | 705/8 |
| 2007/0245300 | A1* | 10/2007 | Chan et al. | 717/105 |
| 2008/0244565 | A1* | 10/2008 | Levidow et al. | 717/176 |
| 2009/0287730 | A1* | 11/2009 | Motoyama et al. | 707/102 |
| 2010/0095235 | A1* | 4/2010 | Bennett et al. | 715/781 |
| 2010/0131942 | A1* | 5/2010 | Nannenga et al. | 717/176 |
| 2010/0138268 | A1* | 6/2010 | Guo et al. | 705/9 |
| 2010/0262653 | A1* | 10/2010 | Chaffee et al. | 709/203 |
| 2010/0299176 | A1* | 11/2010 | Mangipudi et al. | 705/9 |
| 2011/0126151 | A1* | 5/2011 | Bean et al. | 715/810 |
| 2011/0283215 | A1* | 11/2011 | Dunn et al. | 715/771 |

* cited by examiner

*Primary Examiner* — William Bashore
*Assistant Examiner* — Hien Duong
(74) *Attorney, Agent, or Firm* — Kilpatrick Townsend & Stockton LLP

(57) ABSTRACT

In various embodiments, techniques for communicating and visualizing dependencies between a large number of flows are provided. One or more user interfaces can be generated that enable users to interact with information needed to complete each tasks in an ordered or unordered listing of tasks. In some aspects, elements of these user interfaces can including functionality enabling users to interact with each tasks, navigate to information needed to complete each task. In another aspect, one or more styles of presenting information is provided that facilitates navigation to dependency information for each task in a more useful manner. In further aspects, elements of these user interfaces can visually communicate the above functionality and dependency information as well as additional information about each tasks, such as status information, ownership information, or providing an audit trail.

21 Claims, 9 Drawing Sheets

Collections Setup

The table below contains a set of tasks to help you setup, deploy and maintain your Product Suite.

Actions | View

| Task | Go to Task | Status | View Dependencies | |
|---|---|---|---|---|
| ☐ Operations | | | | |
| Define General Collections | 🏛 | ■ | | |
| Set Display Preferences | 🏛 | ■ | | |
| Set up Correspondence | 🏛 | ■ | | |
| ☐ Transactions | | | | |
| * Configure Transaction | 🏛 | 🥐 | | |
| * Configure Metrics | 🏛 | ◓ | | |
| ☐ Collections Method | | | | |
| Select Scoring Components | 🏛 | ■ | | |
| Create Scoring Engine | 🏛 | ■ | 🗔 | |
| * Create Work Items | 🏛 | ■ | | |
| Create Collections Strategies | 🏛 | ■ | 🗔 | |
| Define Strategy Defaults | 🏛 | ■ | 🗔 | |

FIG. 4

Collections Setup

The table below contains a set of tasks to help you setup, deploy and maintain your Product Suite.

← 400

Actions | View

| Task | Go to Task | Status | View Dependencies | Last Updated |
|---|---|---|---|---|
| ☐ Operations | | | | |
| Define General Collections | | | View Dependencies | |
| Set Display Preferences | | | | |
| Set up Correspondence | | | | |
| ☐ Transactions | | | | |
| * Configure Transaction | | | | |
| * Configure Metrics | | ■ | | |
| ☐ Collections Method | | | | |
| Select Scoring Components | | | | |
| Create Scoring Engine | | ■ | | |
| * Create Work Items | | ■ | | |
| Create Collections Strategies | | ■ | | |
| Define Strategy Defaults | | | | |

Popup (500): Create Work Items is dependent on:

| Task | Go to Task | Status | Owner |
|---|---|---|---|
| Configure Metrics | | ✓ | John Smith |
| Create Scoring Engine | | ■ | John Smith |

510 → Task column · 520 → Go to Task · 530 → Status · 540 → Owner

Collections Setup

The table below contains a set of tasks to help you setup, deploy and maintain your Product Suite.

| Task | | | Go to Task | Status | Owner |
|---|---|---|---|---|---|
| ⊟ Operations | | | | | |
| | Define General Collections | | | | |
| | Set Display Preferences | | | | |
| | Set up Correspondence | | | | |
| ⊟ Transactions | | | | | |
| | * Configure Transaction | | | | |
| | * Configure Metrics | 👉 | | | John Smith |
| ⊟ Collections Method | | | | | |
| | Select Scoring Components | | | | |
| | Create Scoring Engine | | 🏛 | ■ | John Smith |
| | * Create Work Items | | | | |
| | Create Collections Strategies | | | | |
| | Define Strategy Defaults | | | | |

Create Work Items is dependent on:

| Task | Go to Task |
|---|---|
| Configure Metrics | 🏛 |
| Create Scoring Engine | 🏛 |

☐ Configure Metrics: Dependent Fields ⟵ 610

Default Transaction Type: Automatic
Vendor Bank: Pacific Bank and Trust

Collections Setup
The table below contains a set of tasks to help you setup, deploy and maintain your Product Suite.

Actions | View

| Task | Go to |
|---|---|
| ☐ Operations | |
| Define General Collections | |
| Set Display Preferences | |
| Set up Correspondence | |
| ☐ Transactions | |
| * Configure Transaction | |
| * Configure Metrics | |
| ☐ Collections Method | |
| Select Scoring Components | |
| Create Scoring Engine | |
| * Create Work Items | |
| Create Collections Strategies | |
| Define Strategy Defaults | |

View Dependencies — 500

Create Work Items is dependent on:

| Task | Go to Task | Status | Owner |
|---|---|---|---|
| Configure Metrics | 📂 | 👆 | John Smith |
| Create Scoring Engine | 📂 | ■ | John Smith |

☐ Configure Metrics: Summary — 620

Accounting Period: Jun-06
Effective Date: 15-Jun-2006

|  | Read Only | Disabled | Enabled |
|---|---|---|---|
| Go to Task |  | 🗎 | 🗎 |
| Task Not Started | ▦ | ▦ | ▦ |
| Task In-progress | ◉ | ◉ | ◉ |
| Task Complete | ✎ | ✎ | ✎ |
|  |  |  |  |

MECHANISM TO COMMUNICATE AND VISUALIZE DEPENDENCIES BETWEEN A LARGE NUMBER OF FLOWS IN SOFTWARE

BACKGROUND OF THE INVENTION

Middleware can include one or more computer software elements that connect other software components or applications. For example, middleware sits "in the middle" between application software that may be working on different operating systems. Examples include EAI software, telecommunications software, transaction monitors, and messaging-and-queuing software. Middleware may include a set of services or technology stack that allows multiple processes running on one or more computer systems to interact and provides for interoperability in support of the move to coherent distributed architectures, which are most often used to support and simplify complex distributed applications.

One example of middleware is Oracle Fusion Middleware (OFM) that includes several software products from Oracle Corporation of Redwood Shores, Calif. Oracle Fusion Middleware spans multiple services, including Java EE and developer tools, integration services, business intelligence, collaboration, and content management and may implement open standards such as BPEL, SOAP, XML and JMS. Oracle Fusion Middleware can provide software for the development, deployment, and management of a service-oriented architecture (SOA).

In another example, Oracle Fusion Applications (OFA) is a portfolio of software products including financial, human resources, payroll, order management, manufacturing management, supply chain management and customer relationship management functions, produced by Oracle Corporation, that spans multiple services and applications. Oracle Fusion Applications may be referred to as an enterprise application suite having a combination of features and functionalities taken from other products such as Oracle E-Business Suite, JD Edwards, PeopleSoft and Siebel Applications product lines.

Enterprise application suites, such as Oracle Fusion Applications, can assimilate features from these other products as well as leveraging capabilities of underlying middleware, such as Oracle Fusion Middleware, using a technology stack including SOA, BPEL, BAM, JSF, Ajax, ESB etc, bringing together underpinnings, such as Business Structure, Security Model, Workflow Process, and Event Models.

Accordingly, what is desired is to solve problems relating to installing and configuring enterprise application suites, some of which may be discussed herein. Additionally, what is desired is to reduce drawbacks related to installing and configuring enterprise application suites, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, techniques for communicating and visualizing dependencies between a large number of flows are provided. In general, flows represent a general course of action that users may take in installing, configuring, provisioning, etc., software applications, in particular various offerings provided by enterprise application suites. A series or a sequence of one or more tasks that need to be completed to install, configure, provision, etc. one or more applications (e.g., offerings of an enterprise application suite) may form part of these flows.

In various aspects, one or more user interfaces can be generated that enable users to interact with information needed to complete each tasks in an ordered or unordered listing of tasks. In some aspects, elements of these user interfaces can including functionality enabling users to interact with each tasks, navigate to information needed to complete each task. In another aspect, one or more styles of presenting information are provided that facilitates navigation to dependency information for each task in a more useful manner. In further aspects, elements of these user interfaces can visually communicate the above functionality and dependency information as well as additional information about each task, such as status information, ownership information, or providing an audit trail.

In some embodiments, one or more methods are provided for communicating and visualizing dependencies between a plurality of tasks that need to be completed to configure an application. These methods may implemented by one or more computer systems. Task information may be received, obtained, or otherwise provided defining each task in the plurality of tasks. The task information may include dependency information specifying dependency relationships between tasks in the plurality of tasks. A first user interface may be generated (or information configured to display such may be generated) that enables users of the one or more user interfaces to interact with the plurality of tasks. The first user interface can include functionality for each task in the plurality of tasks to navigate to information needed to complete the task. The first user interface may further include functionality for a first task in the plurality of tasks to navigate to dependency information associated with the first task.

In further embodiments, users can interact with one or more user interfaces to complete tasks, view dependencies, and other information via the first user interface. For example, information may be received that indicates that a user of the first user interface is interacting with the functionality for the first task to navigate to dependency information associated with the first task. The first user interface may be used or a second user interface may be generated that enables users to interact with the dependency information associated with the first task. Specifically, a second user interface may communicate dependency information and include functionality for a second task in the plurality of tasks on which the first task depends to navigate to the information needed to complete the second task.

Accordingly, in one aspect, users may more efficiently and effectively view and interact with large numbers of tasks that may have dependencies between the tasks that need to be completed to use one or more applications. Therefore, dependency information describing how the first task depends on the second task can be communicated and visualized via the first and second user interfaces in response to user interactions. In some embodiments, the second user interface that enables users to interact with the dependency information associated with the first task can communicate whether there is a task level dependency between the first task and the second task or whether there is a field level or attribute dependency between the first task and the second task. In still further embodiments, information may be received indicating that a user of the second user interface is interacting with the functionality for the second task to navigate to the information needed to complete the second task. The first or second user interface may be used or one or more additional user interfaces (e.g., a third user interface) may be generated that enables users to interact with the information needed to complete the second task.

In at least one embodiment, generating a second user interface that enable users to interact with dependency information associated with the first task may include providing a visual representation of the functionality for the second task on which the first task depends to navigate to the information needed to complete the second task that takes into account a role associated with the user. In at least another embodiment, generating a second user interface that enable users to interact with dependency information associated with the first task may include providing status information for the second task. Providing the status information for the second task may in some embodiments include providing a visual representation of a status associated with the second task which takes into account a role associated with the user. Providing the status information for the second task may in further embodiments include providing a visual representation of a status associated with the second task which takes into account one or more policies for enforcing dependencies between tasks. In yet another embodiment, generating a second user interface that enable users to interact with dependency information associated with the first task may include providing ownership information for the second task. The second user interface may also include functionality for the second task to perform one or more actions with respect to the ownership information for the second task.

In another embodiment, generating a first user interface that enables users to interact with the plurality of tasks may include providing a visual representation of the functionality for each task to navigate to information needed to complete the task which takes into account a role associated with the user of the first user interface. Generating a first user interface that enables users to interact with the plurality of tasks may include providing a visual representation of the functionality for each task to navigate to information needed to complete the task which takes into account whether one or more tasks on which the task depends have been completed. Generating a first user interface that enables users to interact with the plurality of tasks may additionally include providing ownership information for each task. Generating a first user interface that enables users to interact with the plurality of tasks may additionally include providing an audit trail for each task.

In still further embodiments, the functionality for each task in the plurality of tasks to navigate to information needed to complete the task or the functionality for the first task to navigate to dependency information associated with the first task may include or be represented by one or more links or other navigation aids associated with one or more visual representations of the corresponding functionality. In yet another embodiment, generating the first user interface may include ordering at least some of the tasks in the plurality of tasks according to the dependency information specifying the dependency relationships between tasks in the plurality of tasks. In further embodiments, tasks can be presented in an unordered manner.

In at least one embodiment, a non-transitory computer-readable medium is provided storing computer-executable code for communicating and visualizing dependencies between a plurality of tasks that need to be completed to configure an application. The computer-readable medium can include code for receiving dependency information specifying dependency relationships between tasks in the plurality of tasks; code for generating a first user interface that enables users to interact with the plurality of tasks, the first user interface having functionality for each task in the plurality of tasks to navigate to information needed to complete the task and functionality for a first task in the plurality of tasks to navigate to dependency information associated with the first task; code for receiving information indicating that a user of the first user interface is interacting with the functionality for the first task in the plurality of tasks to navigate to dependency information associated with the first task; and code for generating a second user interface that enables users to interact with dependency information associated with the first task based on the user interacting with the functionality for the first task, the second user interface having functionality for a second task in the plurality of tasks on which the first task depends to navigate to the information needed to complete the second task.

In at least one embodiment, a system is provided for communicating and visualizing dependencies between a plurality of tasks that need to be completed to configure an application. The system can include a processor and a memory coupled to the processor and configured to store a set of instructions. The instruction can be configured to cause the processor to receive dependency information specifying dependency relationships between tasks in the plurality of tasks; communicate information configured to generate a first user interface that enables users to interact with the plurality of tasks, the first user interface having functionality for each task in the plurality of tasks to navigate to information needed to complete the task and functionality for a first task in the plurality of tasks to navigate to dependency information associated with the first task; receive information indicating that a user of the first user interface is interacting with the functionality for the first task in the plurality of tasks to navigate to dependency information associated with the first task; and generate a second user interface that enables users to interact with dependency information associated with the first task based on the user interacting with the functionality for the first task, the second user interface having functionality for a second task in the plurality of tasks on which the first task depends to navigate to the information needed to complete the second task.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or or examples, or the presently understood best mode of any innovations presented within this disclosure.

FIG. 4 is an illustration of a user interface having functionality for communicating and visualizing dependencies in one embodiment according to the present invention.

FIG. 5 is an illustration of a user interface having functionality for interacting with dependency information in one embodiment according to the present invention.

FIG. 6A is an illustration of the user interface of FIG. 5 providing field level dependency information in one embodiment according to the present invention.

FIG. 6B is an illustration of the user interface of FIG. 5 providing important summary information about a dependent task in one embodiment according to the present invention.

DETAILED DESCRIPTION OF THE INVENTION

During the setup phase of complex enterprise application suites, such as Oracle Fusion Applications, there can be a very large number of actions that users need to complete in order to properly set up each application in the suite and any interactivity/communication between applications and components. These flows may be represented by series or sequences of tasks that may be completed in a variety of ways. In the past, dependency analysis is often commonly done via external reporting tools and possibly using hard documentation. However, having this information directly in one or more user interfaces viewed by users installing and configuring an enterprise application suite can increase user productivity and overall usability.

In various aspects, one or more user interfaces can be generated that enable users to interact with information needed to complete each tasks in an ordered or unordered listing of tasks. In some aspects, elements of these user interfaces can including functionality enabling users to interact with each tasks, navigate to information needed to complete each task. In another aspect, one or more styles of presenting information are provided that facilitates navigation to dependency information for each task in a more useful manner. In further aspects, elements of these user interfaces can visually communicate the above functionality and dependency information as well as additional information about each task, such as status information, ownership information, or providing an audit trail.

In order to better understand one or more of the inventions presented within this disclosure, aspects of at least one environment within which various embodiments may operate will first be described.

Figure 1:
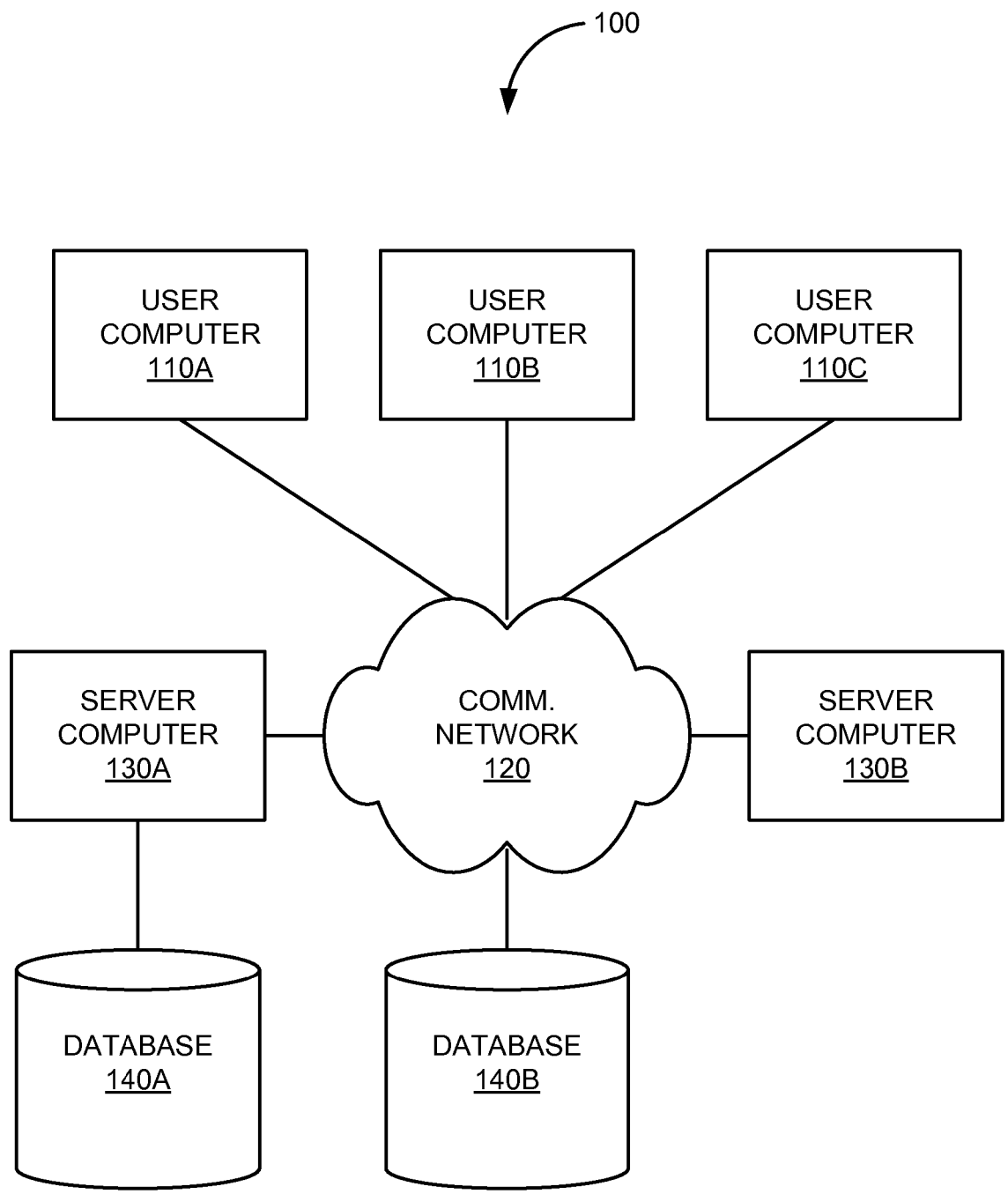
FIG. 1 is a simplified illustration of a system that may incorporate an embodiment of the present invention.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one or more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, JavaScript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 120 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

Communicating and Visualizing Dependencies

In various embodiments, system 100 may incorporate techniques for communicating and visualizing dependencies in one or more user interface solutions that devise simple, elegant, and generic ways to communicate flow/task relationships for installing, configuring, provisioning, setup, etc. of hardware and/or software elements (e.g., enterprise application suites hosted by servers associated with system 100). Accordingly, system 100 may allow for a great deal of expandability to designs to suit custom implementations. In some embodiments, one or more user interfaces can be provided that are both viewable and actionable (e.g., if allowed by security permissions) for communicating and visualizing dependency information.

Figure 2:
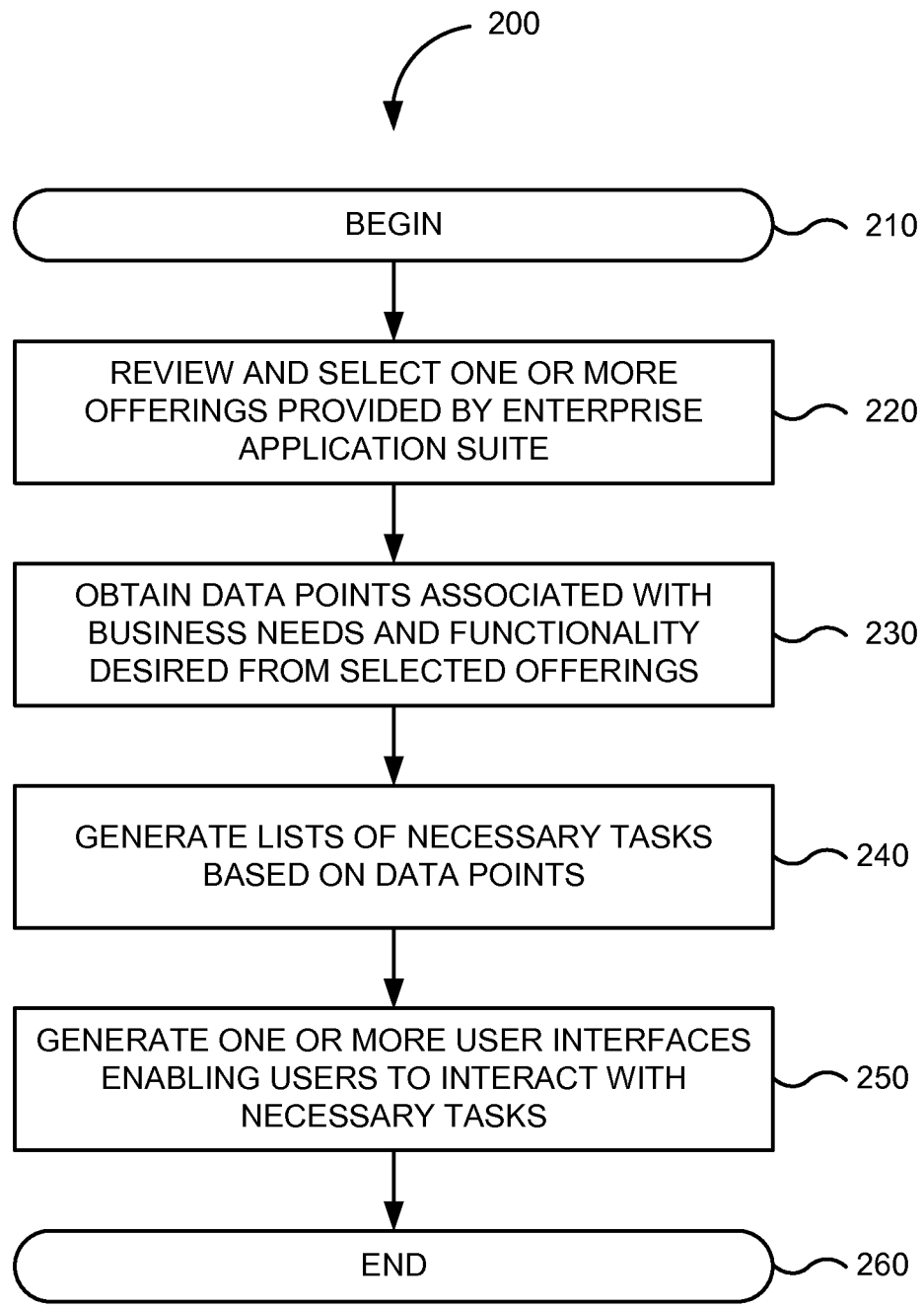
FIG. 2 is a flowchart of a method for provisioning an enterprise application suite in one embodiment according to the present invention that may include one or more of the disclosed techniques for communicating and visualizing dependencies.

FIG. 2 is a flowchart of method 200 for provisioning an enterprise application suite in one embodiment according to the present invention that may include one or more of the disclosed techniques for communicating and visualizing dependencies. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, one or more offerings provided by an enterprise application suite are selected. As discussed above, an enterprise application suite may include a variety of offerings, such as software programs providing generic or specifically tailored solutions, development environments, technology stacks providing interactivity and interconnectivity between various software programs, or the like. Each offering of an enterprise application suite may further include additional software applications, services, technology stacks, development environments, or the like. For example, during a planning phase for a new enterprise application suite installation, one or more users or administrators may review whitepapers, product information, manuals, vendor materials, online guides, or the like to select which product components are to be utilized.

Some examples of offerings may include enterprise application server components (e.g., Oracle Weblogic Server, Oracle Application Server, JRockit (a JVM), Tuxedo (software)). Further examples of offerings may include integration- and process-management components (e.g., BPEL Process Manager, business activity monitoring components, business rules, Business Process Analysis Suite, business process management, Oracle Data Integrator (ODI), enterprise connectivity (adapters), Oracle Enterprise Messaging Service, Oracle Enterprise Service Bus, Oracle Application server B2B, Oracle Service Registry, Oracle Web Services Manager (OWSM)—a security and monitoring product for web services). Further examples of offerings may include development tools and components (e.g., Oracle Application Development Framework, JDeveloper, Oracle SOA Suite, TopLink—a Java object-relational mapping package, Oracle Forms services, Oracle Developer Suite). Further examples of offerings may include business intelligence components (e.g., Oracle Business Intelligence, Oracle Business Activity Monitoring (Oracle BAM), Oracle Discoverer). Further examples of offerings may include data hubs and components (e.g., Oracle BI Publisher, Oracle Reports services), systems management (e.g., Oracle Enterprise Manager, Web services manager), and user interaction components (e.g., Oracle Beehive collaboration software, Oracle Portal, Oracle Webcenter, Real-time collaboration, Unified messaging, Workspaces).

Further examples of offerings may include content management components (e.g., Oracle Imaging and Process Management, Web content management, Records management, Enterprise search, Digital asset management, Email archiving, Oracle Universal Content Management), identity management components (e.g., Enterprise Single sign-on, Oracle Entitlements Server, Oracle Identity Manager, Oracle Access Manager, Oracle Adaptive Access Manager, Oracle Information Rights Management), grid infrastructure components (e.g., Services registry, application-server security), and performance components (e.g., Oracle Web Cache), or the like.

One or more offering may be selected according to the business needs of an organization and any desired functionality from product offerings. In step 230, data points associated with any business needs and desired functionality from product offerings are obtained. This may include one or more data input or data gathering activities and include the use of forms, questionnaires, surveys, or the like. Additionally, there may be branding or other customization needs associated with the offerings. Moreover, the offerings themselves may have requirements, such as one or more internal or external dependencies. Internal dependencies can include direct or indirect reliance of one process or activity provided by an offering upon internal data or another process or activity provided by the same offering. External dependencies can include direct or indirect reliance of one process or activity provided by an offering upon external data or another process or activity provided by another offering, external computer program, or service. The satisfaction of certain requirements may be necessary for certain functionality to be provided. In other examples, some requirements may be optionally satisfied while others unmet without reduced functionality. All or part of the information satisfying these requirements may be obtained in one or more data input or data gathering activities and include the use of forms, questionnaires, surveys, or the like.

In step 240, a list of necessary tasks is generated or otherwise determined based on these data points. For example, task information associated with one or more offerings that meet specified business needs or functionality may be obtained. In another example, task information associated with how offerings may be branded, personalized, or otherwise customized to an organization may be obtained. In yet another example, task information associated with requirements and dependencies of offerings may be obtained.

Task information can include information defining one or more tasks that need to be completed in each of a variety of phrases associated with the installation, configuration, provisions, setup, etc. of an offering or required component. Task information may include dependency information defining dependency relationships between tasks. In one example, dependency information may define a dependency relationship at a task level. In other words, one task is merely dependent on the completion of another task. In another example, dependency information may define a dependency relationship at an information level such that one task may be dependent on information from another task. A task may be dependent on fields of another task, output of another task, attributes of another tasks, or the like.

In a still further example, an enterprise software application may need to be configured to meet business and/or industry, requirements, guidelines, compliance statutes, or the like. As such, these may be expressed in the task information. In yet another example, an organization may require multiple testing, development, and production environments before end users can begin using software. How these environments differ may be captured in the task information.

In various embodiments, task information may be created by a variety of sources. For example, a preconfigured set of tasks may be supplied with each offering provided by an enterprise application suite. In another example, a consultant or added value reseller may create tasks specific to the consultants business or to a particular clients needs. In yet another example, a user of an offering may interact with one or more task creation forms to create user-generated task. Notwithstanding how task information is generated, in various embodiments, dependency information may be provided that specifies dependency relationships between tasks.

In step 250, one or more user interfaces are generated enabling users to interact with any necessary tasks. In various embodiments, tasks may be presented in the one or more user interfaces as non-ordered, ordered, linear, non-linear, hierarchical, non-hierarchical, or the like. Additionally, dependencies between tasks may be presented in the one or more user interfaces as non-ordered, ordered, linear, non-linear, hierarchical, non-hierarchical, or the like.

In further embodiments, determinations may be made as to which way to communicate and visualize tasks and their dependencies to users. Tasks and dependency information may be communicated to be both viewable and functional. The one or more user interfaces may be incorporated into either an application or into a project associated with installation, configuration, provisioning, setup, etc. of one or more applications. The one or more user interface may incorporate static elements, dynamic elements, interactive elements, or the like to provide a guided process that walks users through a number of tasks to configure selected offerings. FIG. 2 ends in step 260.

Figure 3:
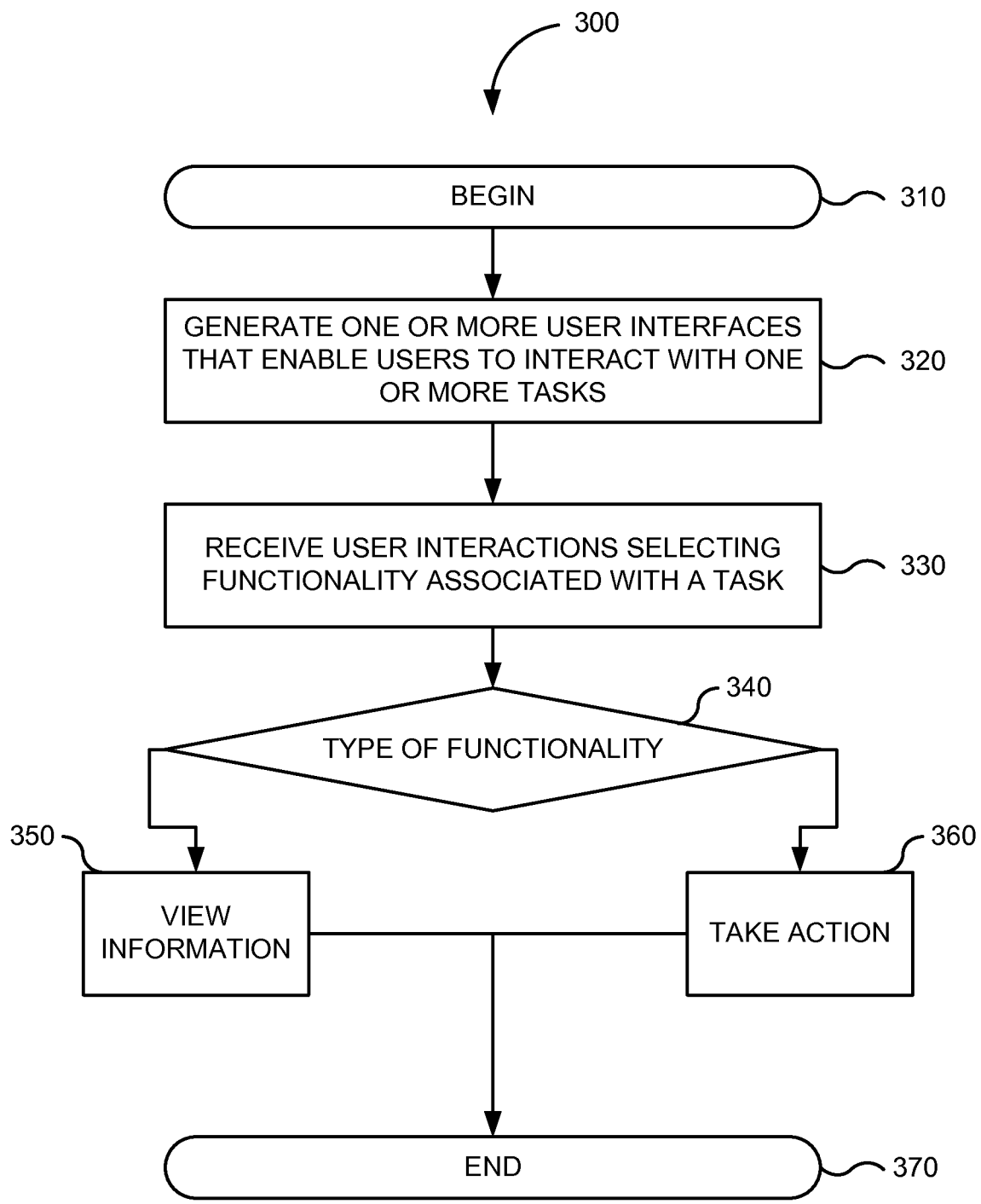
FIG. 3 is a flowchart of a method for generating one or more user interfaces enabling users to view tasks and interact with dependent tasks in one embodiment according to the present invention.

FIG. 3 is a flowchart of method 300 for generating one or more user interfaces enabling users to view tasks and interact with dependent tasks in one embodiment according to the present invention. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, one or more user interfaces are generated that enable users to interact with each task in a plurality of tasks. In various embodiments, the one or more user interfaces can be generated to communicate dependency information associated with at least some of the plurality of tasks. Dependency information defines or otherwise specifies dependency relationships between tasks. As discussed above, a dependency relationship may include a task level dependency or an information dependency (e.g., a field level or attribute dependency). Tasks may be presented sequentially or non-sequentially, hierarchically using a tree table, or as a flat list using a table. A list of related tasks may be grouped in categories. There may or may not be a required order in which the tasks need to be performed. In various embodiments, guidance and additional information about specific tasks and their dependencies can be provided by showing/hiding functionality on the one or more user interfaces and enabling/disabling displayed functionality or visual representations of such.

FIG. 4 is an illustration of user interface 400 having functionality for communicating and visualizing dependencies in one embodiment according to the present invention. In this example, user interface 400 includes column 410 providing a list of tasks shown in a single view. As tasks can be structured in a hierarchy, user interface 400 provides category 420 labeled "Transactions" having dependent tasks labeled "Configure Transaction" and "Configure Metrics." In some embodiments, category 420 may be an actual task.

User interface 400 further includes column 430 labeled "Go to Task." Column 430 may provide information about how to go to or otherwise access each task in the list of tasks. Column 430 may further incorporate one or more stylistic features communicating information and/or functionality that enable users to navigate to information for completing each task. For example, column 430 may include textual information and/or one or more icons, links, or other visual representations of associated functionality for each task in the list of tasks for navigating to a task or to information needed for completing the task. In this example, column 430 may include icon 440 for the task labeled "Configure Transaction." A user may interact with icon 440, such as by activating icon 440 or clicking on icon 440.

In some embodiments, the one or more stylistic features communicating information and/or functionality associated with column 430 may be displayed or hidden based on predetermined criteria, such as security privileges, access control lists, whether a user having a particular role is able to access a task, or whether the task depends on other tasks, or other applicable policies. In one example, if the one or more stylistic features communicating information and/or functionality associated with column 430 are hidden then a user may assume that a corresponding task is not applicable to the user. Accordingly, whether the one or more stylistic features communicating information and/or functionality associated with column 430 is displayed or hidden may be one way that user interface 400 provides guidance to a user when viewing and completing tasks. Additionally, the one or more stylistic features communicating information and/or functionality associated with column 430 may be displayed but disabled, partially enabled, or fully enabled based on different criteria, such as that discussed above. In some embodiments, column 430 may indicate whether the information for completing each task in the list of tasks is totally read-only, partially read-only, or the like. Whether the functionality associated with column 430 is displayed but disabled, partially enabled, or fully enabled may be another way that user interface 400 provides guidance to a user when viewing and completing tasks.

In still further embodiments, user interface 400 can include column 450 labeled "Status." System 100 may track the status whenever possible. In some cases, changing setup settings in one task can causes problems or errors in another task. When this occurs, an error or warning icon may be provided in the status column to inform a user that there is a problem. Column 450 may provide information about the status of each task. Column 450 may further incorporate one or more stylistic features and/or functionality enabling users to navigate to status information for each task. For example, column 450 may include one or more icons or other visual representations of the status of each task. Column 450 may include icons, links, or other visual representations of the functionality for each task for navigating to status information. In this example, column 450 may include icon 460 for the task labeled "Configure Transaction." User interface 400 may use icon 460 to communicate the status of the task or a user may interact with icon 460, such as by activating icon 460 or clicking on icon 460 to view or otherwise navigate to status information for the task.

User interface 400 may utilize various visual representations of status information to indicate the status of each task. For example, an icon depicting a clock may indicate that a task has been started. In another example, an icon depicting a solid square may indicate that a task has not been started. In yet another example, an icon depicting a check or checkmark may indicate that a task has been completed. In still yet another example, an icon depicting a warning in the form of a question mark within a triangle may indicate that a task has a potential problem, such as due to a change made to another task. Column 450 may also include other visual representations for depicting intermediate progress indicators.

In some embodiments, visual representations of status information and/or functionality associated with column 460 may be displayed and hidden based on different criteria, such as security privileges, access control lists, whether a user having a particular role is able to access a task, or whether the task depends on other tasks, or other applicable policies. Whether the visual representations of status information and/or functionality associated with column 460 is displayed or hidden may be one way that user interface 400 provides guidance to a user when viewing and completing tasks. Additionally, visual representations of status information and/or functionality associated with column 460 may be displayed but disabled, partially enabled, or fully enabled based on different criteria, such as that discussed above. Whether the functionality associated with column 460 is displayed but disabled, partially enabled, or fully enabled may be another way that user interface 400 provides guidance to a user when viewing and completing tasks.

In further embodiments, user interface 400 can include column 470 labeled "View Dependencies." Column 470 may provide dependency information for each task. Column 470 may further incorporate one or more stylistic features and/or functionality enabling users to navigate to dependency information for each task. For example, column 470 may include one or more icons, links, or other visual representations of functionality for each task for navigating to dependency information for each task. In this example, column 470 may include icon 480 for the task labeled "Create Work Items." A user may interact with icon 480, such as by activating icon 480 or clicking on icon 480.

In some embodiments, the one or more stylistic features and/or functionality associated with column 470 may be displayed and hidden based on different criteria, such as security privileges, access control lists, whether a user having a particular role is able to access a task, or whether the task depends on other tasks, or other applicable policies. Whether the one or more stylistic features and/or functionality associated with column 470 is displayed or hidden may be one way that user interface 400 provides guidance to a user when viewing and completing tasks. Additionally, the one or more stylistic features and/or functionality associated with column 470 may be displayed but disabled, partially enabled, or fully enabled based on different criteria, such as that discussed above. In some embodiments, column 430 may indicate whether the dependency information for a task is totally read-only, partially read-only, or the like. Whether the functionality associated with column 470 is displayed but disabled, partially enabled, or fully enabled may be another way that user interface 400 provides guidance to a user when viewing and completing tasks.

In further embodiments, user interface 400 can optionally include column 490. Column 490 may provide information and/or functionality enabling users to view information or perform one or more actions associated with tasks. For example, column 490 may be utilized to view ownership information for each task, how a task is assigned, an audit trail depicting when each task was last accessed, updated, completed, etc., or the like. As such, user interface 400 may communicate other information and/or functionality, such as task owner information, updated by information for the person who last updated each task, attachments allowing the display of any associated attachments for each task, and description information providing a description of each task, such as when a task name does not fully describe a task. User interface 400 may include other information and/or functionality response to a user's role, ownership permissions, control lists, approval settings, or the like.

Returning to FIG. 3, in step 330, one or more user interactions are received selecting functionality associated with a task. For example, a user of user interface 400 of FIG. 4 may interact with icon 480, such as by activating icon 480 or clicking on icon 480, to view dependency information associated with the task labeled "Create Work Items." In step 340, the type of functionality is determined. Functionality may be of viewing information (e.g., a read-only tasks) or the taking of one or more actions.

In step 350, if the functionality is associated with viewing information, the one or more user interfaces can present relevant information to the user about a selected task. In step 360, if the functionality is associated with taking one or more actions, the one or more user interfaces an presented further functionality for taking the one or more actions. Accordingly, one or more user interfaces are generated that enable users to interact with tasks, their information, and their dependencies. Users can navigate to information needed to complete each tasks, view and complete dependent tasks, check status information, or the like. FIG. 3 ends in step 370.

FIG. 5 is an illustration of user interface 500 having functionality for interacting with dependency information in one embodiment according to the present invention. User interface 500 may include dependency information, such as one or more dependency relationships between tasks. User interface 500 further may include predecessor task information. User interface 500 may also include one or more stylistic elements and/or functionality for dependent tasks to navigate to information for completing each dependent task. In this example, user interface 500 is viewed in a dialog window associated with the context of user interface 400. User interface 500 can include column 510 labeled "Task" providing a list of tasks shown in a single view. The tasks can be structured or displayed according to an ordering, in a hierarchy, or non-linearly.

User interface 500 further includes column 520 labeled "Go to Task." Column 520 may provide information about how to go to or otherwise access each dependent task. Column 520 may further incorporate one or more stylistic features and/or functionality that enable users to navigate to information for completing each dependent task. For example, column 520 may include one or more icons, links, or other visual representations of functionality for each dependent task for navigating to the dependent task or other information needed for completing the dependent task. A user may interact with such functionality for navigating to information for completing a dependent task, e.g., by activating icons or clicking on icons, as discussed above with respect to user interface 400 of FIG. 4.

In some embodiments, the one or more stylistic features communicating information and/or functionality associated with column 520 may be displayed and hidden based on different criteria, such as security privileges, access control lists, whether a user having a particular role is able to access a dependent task, or whether the dependent task depends on other tasks, or other applicable policies. Whether the one or more stylistic features communicating information and/or functionality associated with column 520 is displayed or hidden may be one way that user interface 500 provides guidance to a user when viewing and completing dependent tasks. Additionally, the one or more stylistic features communicating information and/or functionality associated with column 520 may be displayed but disabled, partially enabled, or fully enabled based on different criteria, such as that discussed above. Whether the one or more stylistic features communicating information and/or functionality associated with column 520 is displayed but disabled, partially enabled, or fully enabled may be another way that user interface 500 provides guidance to a user when viewing and completing dependent tasks.

In still further embodiments, user interface 500 can include column 530 labeled "Status." Column 530 may provide information about the status of each dependent task. Column 530 may further incorporate one or more stylistic features and/or functionality enabling users to navigate to status information for each dependent task. For example, column 530 may include one or more icons or other visual representations of the status of each dependent task. Column 530 may include icons, links, or other visual representations of the functionality for each dependent task for navigating to status information. A user may interact with such functionality for navigating to status information, e.g., by activating icons or clicking on icons, as discussed above with respect to user interface 400 of FIG. 4. Additionally, user interface 500 may utilize various visual representations of status information to indicate the status of each dependent task as discussed above with respect to user interface 400 of FIG. 4.

In further embodiments, user interface 500 can include column 540 labeled "Owner." Column 540 may provide ownership information for each dependent task. Column 540 may further be labeled "Assigned to" indicating whether a given user is an owner or assignee of a task. Ownership information may include the name of an owner of a task or dependent task, contact or organization information, or the like. Column 470 may further incorporate one or more stylistic features and/or functionality enabling users to navigate to ownership information for each dependent task. For example, column 470 may include one or more icons, links, or other visual representations of functionality for each task for navigating to ownership information for each dependent task.

In various embodiments, a user may interact with such functionality for navigating to ownership information, e.g., by activating icons or clicking on icons, as discussed above with respect to user interface 400 of FIG. 4. User interface 500 may be used or one or more additional user interfaces may be generated to provide one or more actions based on the ownership information for a dependent task. In one example, a first user who is assigned as an owner of a first task that depends on a second task may utilize the ownership information associated with the second task to contact a second user who is listed as an owner of the second task. Other examples of actions that may be performed may include generating notifications, providing reports, assigning or transferring ownership, seeking approval or initiating other workflows, or the like.

In various embodiments, further information may be provided for dependent tasks. FIG. 6A is an illustration of user interface 500 of FIG. 5 providing field level dependency information in one embodiment according to the present invention. For example, a user may interact with user interface 500 to select the dependent task labeled "Configure Metrics." User interface 500 may be configured to provide dependency information 610 specifying one or more field level dependencies between the task labeled "Create Work Items" and the task labeled "Configure Metrics." In this example, dependency information 610 may communicate that the task labeled "Create Work Items" is dependent on fields (e.g., the fields "Default Transaction Type" and "Vendor Bank") and/or one or more field data points (e.g., "Automatic" and "Pacific Bank and Trust") associated with the task labeled "Configure Metrics." A field label and/or identifier as well as any data of each individual data points can be distinguished by font size and/or bolding of one or the other and/or color and/or font style. Preferable, dependency information 610 is provided in a read-only manner although functionality may be provide for editing particular data points or navigating to a dependent tasks for editing of data points.

FIG. 6B is an illustration of user interface 500 of FIG. 5 providing important summary information about a dependent task in one embodiment according to the present invention. For example, a user may interact with user interface 500 to select the dependent task labeled "Configure Metrics." User interface 500 may be configured to provide dependency information 620 specifying general information about a dependent tasks, specific information about what the task accomplishes, important attributes of the task that can be or have been established when completing the task, or the like. Additionally, dependency information 620 may information about how attributes are utilized or needed, their values, or the like. Preferable, dependency information 620 is provided in a read-only manner.

While user interface 500 is depicted as displaying either dependent information 610 or dependency information 620, it is contemplated that user interface 500 may be configured to communicate none, one, the other, or a combination of dependent information 610 and dependency information 620. Dependent information 610 and dependency information 620 may be hidden suggesting to a user that any information is not applicable to that user, read-only, or include functionality that is displayed and either enabled or disabled as discussed above. Summary information, individual data points, and other information presented in user interface 500 can be distinguished by font size and/or bolding of one or the other and/or color and/or font style.

Figure 7:
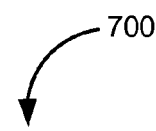
FIG. 7 is an illustration of a collection of icons that may be used with the user interface of FIGS. 4 and 5 providing information and functionality in one embodiment according to the present invention.

FIG. 7 is an illustration of collection 700 of icons that may be used with the user interface of FIGS. 4 and 5 information and functionality in one embodiment according to the present invention. In this example, a list of icon associated with navigating to a task (e.g., "Goto Task") may be presented as "Read Only," "Disabled," and "Enabled." A list of icon associated with a task's status (e.g., "Task Not Started," "Task In-progress," and "Task Complete") may be presented as "Read Only," "Disabled," and "Enabled." As discussed above, this may be one way in which dependency information is communicated to a user, such as whether an icon is displayed or not, and if displayed, whether the icon is enabled or disabled.

Figure 8:
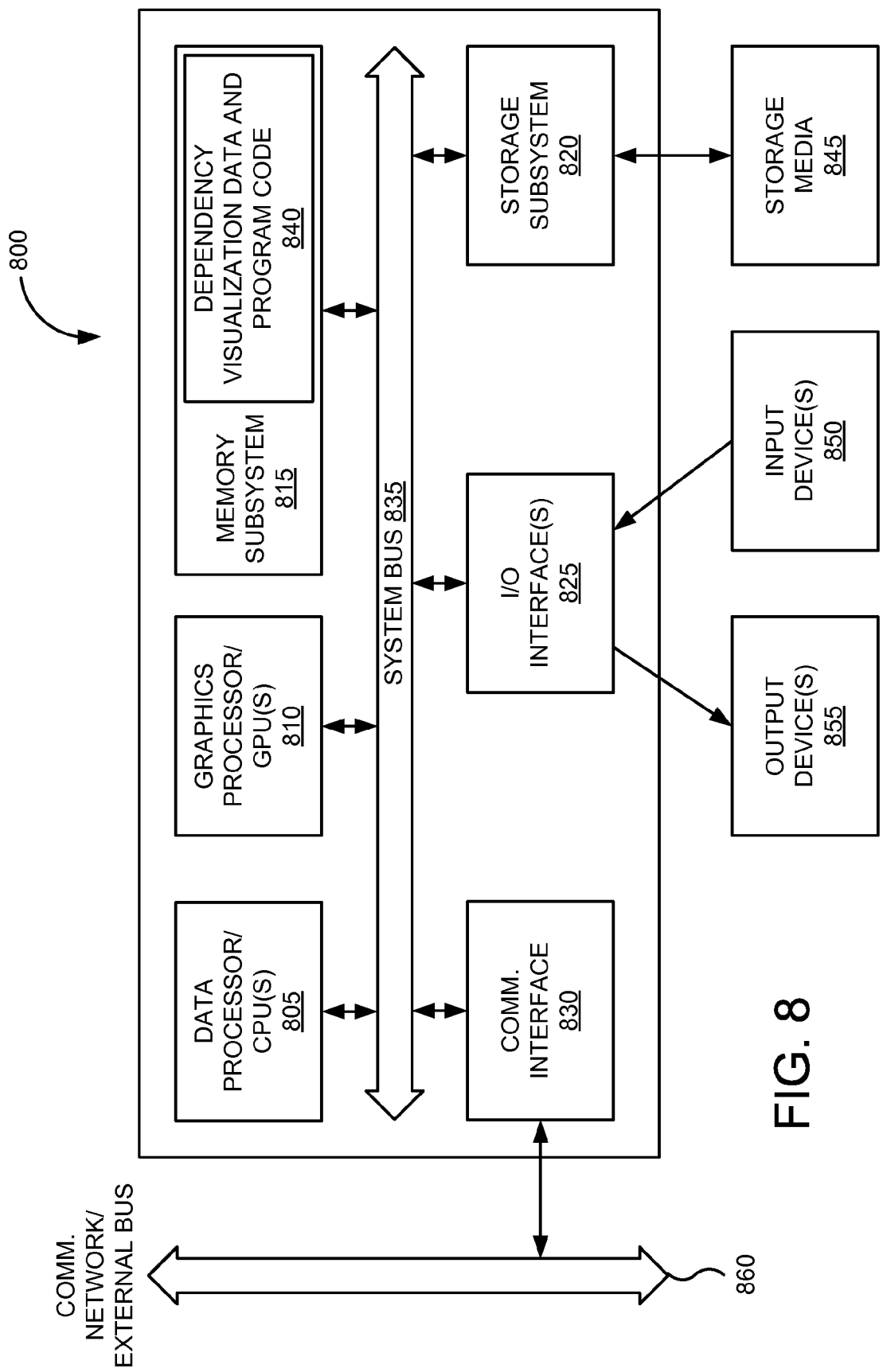
FIG. 8 is a block diagram of a computer system or information processing device that may incorporate an embodiment, be incorporated into an embodiment, or be used to practice any of the innovations, embodiments, and/or examples found within this disclosure.

FIG. 8 is a block diagram of computer system 800 that may incorporate an embodiment, be incorporated into an embodiment, or be used to practice any of the innovations, embodiments, and/or examples found within this disclosure. FIG. 8 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 800 can include hardware and/or software elements configured for performing logic operations and calculations, input/output operations, machine communications, or the like. Computer system 800 may include familiar computer components, such as one or more one or more data processors or central processing units (CPUs) 805, one or more graphics processors or graphical processing units (GPUs) 810, memory subsystem 815, storage subsystem 820, one or more input/output (I/O) interfaces 825, communications interface 830, or the like. Computer system 800 can include system bus 835 interconnecting the above components and providing functionality, such connectivity and inter-device communication. Computer system 800 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 805 can include hardware and/or software elements configured for executing logic or program code or for providing application-specific functionality. Some examples of CPU(s) 805 can include one or more microprocessors (e.g., single core and multi-core) or micro-controllers. CPUs 805 may include 4-bit, 8-bit, 12-bit, 16-bit, 32-bit, 64-bit, or the like architectures with similar or divergent internal and external instruction and data designs. CPUs 805 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD 64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 805 may also include one or more field-gate programmable arrays (FPGAs), application-specific integrated circuits (ASICs), or other microcontrollers. The one or more data processors or central processing units (CPUs) 805 may include any number of registers, logic units, arithmetic units, caches, memory interfaces, or the like. The one or more data processors or central processing units (CPUs) 805 may further be integrated, irremovably or moveably, into one or more motherboards or daughter boards.

The one or more graphics processor or graphical processing units (GPUs) 810 can include hardware and/or software elements configured for executing logic or program code associated with graphics or for providing graphics-specific functionality. GPUs 810 may include any conventional graphics processing unit, such as those provided by conventional video cards. Some examples of GPUs are commercially available from NVIDIA, ATI, and other vendors. In various embodiments, GPUs 810 may include one or more vector or parallel processing units. These GPUs may be user programmable, and include hardware elements for encoding/decoding specific types of data (e.g., video data) or for accelerating 2D or 8D drawing operations, texturing operations, shading operations, or the like. The one or more graphics processors or graphical processing units (GPUs) 810 may include any number of registers, logic units, arithmetic units, caches, memory interfaces, or the like. The one or more data processors or central processing units (CPUs) 805 may further be integrated, irremovably or moveably, into one or more motherboards or daughter boards that include dedicated video memories, frame buffers, or the like.

Memory subsystem 815 can include hardware and/or software elements configured for storing information. Memory subsystem 815 may store information using machine-readable articles, information storage devices, or computer-readable storage media. Some examples of these articles used by memory subsystem 870 can include random access memories (RAM), read-only-memories (ROMS), volatile memories, non-volatile memories, and other semiconductor memories. In various embodiments, memory subsystem 815 can include dependency visualization data and program code 840.

Storage subsystem 820 can include hardware and/or software elements configured for storing information. Storage subsystem 820 may store information using machine-readable articles, information storage devices, or computer-readable storage media. Storage subsystem 820 may store information using storage media 845. Some examples of storage media 845 used by storage subsystem 820 can include floppy disks, hard disks, optical storage media such as CD-ROMS, DVDs and bar codes, removable storage devices, networked storage devices, or the like. In some embodiments, all or part of dependency visualization data and program code 840 may be stored using storage subsystem 820.

In various embodiments, computer system 800 may include one or more hypervisors or operating systems, such as WINDOWS, WINDOWS NT, WINDOWS XP, VISTA, WINDOWS 8 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 800 may also include one or more applications configured to execute, perform, or otherwise implement techniques disclosed herein. These applications may be embodied as dependency visualization data and program code 840. Additionally, computer programs, executable computer code, human-readable source code, processing engines, or the like, and data, such as transaction data, models, objects, procedural descriptions, files, or the like, may be stored in memory subsystem 815 and/or storage subsystem 820.

The one or more input/output (I/O) interfaces 825 can include hardware and/or software elements configured for performing I/O operations. One or more input devices 850 and/or one or more output devices 855 may be communicatively coupled to the one or more I/O interfaces 825.

The one or more input devices 850 can include hardware and/or software elements configured for receiving information from one or more sources for computer system 800. Some examples of the one or more input devices 850 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 850 may allow a user of computer system 800 to interact with one or more non-graphical or graphical user interfaces to enter a comment, select objects, icons, text, user interface widgets, or other user interface elements that appear on a monitor/display device via a command, a click of a button, or the like.

The one or more output devices 855 can include hardware and/or software elements configured for outputting information to one or more destinations for computer system 800. Some examples of the one or more output devices 855 can include a printer, a fax, a feedback device for a mouse or joystick, external storage systems, a monitor or other display device, a communications interface appropriately configured as a transceiver, or the like. The one or more output devices 855 may allow a user of computer system 800 to view objects, icons, text, user interface widgets, or other user interface elements.

A display device or monitor may be used with computer system 800 and can include hardware and/or software elements configured for displaying information. Some examples include familiar display devices, such as a television monitor, a cathode ray tube (CRT), a liquid crystal display (LCD), or the like.

Communications interface 830 can include hardware and/or software elements configured for performing communications operations, including sending and receiving data. Some examples of communications interface 830 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 830 may be coupled to communications network/external bus 880, such as a computer network, to a FireWire bus, a USB hub, or the like. In other embodiments, communications interface 830 may be physically integrated as hardware on a motherboard or daughter board of computer system 800, may be implemented as a software program, or the like, or may be implemented as a combination thereof.

In various embodiments, computer system 800 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 800.

As suggested, FIG. 8 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:
    receiving, at one or more computer systems, a selection of a plurality of offerings provided by an enterprise product suite;
    determining, by one or more processors associated with the one or more computer systems, a set of tasks that deploy each offering in the plurality of selected offerings;
    generating, by the one or more processors associated with the one or more computer systems, a first view of the set of tasks that deploy at least one of the selected plurality of offerings, the first view comprising at least one navigation element for each task in the set of tasks to complete the task, at least one status element for each task in the set of tasks representing state of the task, and at least one dependency information element for each task in the set of tasks having dependencies, wherein each of the at least one navigation element, the at least one status element, and the at least one dependency information element of each task in the first view is included or stylized based on predetermined criteria applicable to a user or the task;
    generating, by the one or more processors associated with the one or more computer systems, a second view of information needed to complete a first task in the set of tasks based on a first interaction of the user with a first navigation element for the first task, the first navigation element determined to be accessible to the user according to the predetermined criteria; and
    generating, by the one or more processors associated with the one or more computer systems, a third view of dependency information associated with the first task based on a second interaction of the user with a first dependency information element for the first task, the third view comprising an overlay of the first view and a combination of at least one navigation element to complete a second task in the set of tasks, the second task having a relationship with the first task, and at least one status element representing state of the second task, the first dependency information element determined to be accessible to the user according to the predetermined criteria.

2. The method of claim 1, the third view further comprising at least one element indicating:
    a task level dependency between the first task and the second task, or
    a field level dependency between the first task and the second task.

3. The method of claim 1 wherein generating the first view further comprises determining whether the at least one navigation element, the at least one status element, or the at least one dependency information element for each task in the first view is included or stylized based on a role associated with the user.

4. The method of claim 1 wherein generating the third view further comprises determining whether the at least one navigation element to complete the second task is included or stylized based on a role associated with the user.

5. The method of claim 1 wherein generating the third view further comprises determining whether the at least one status element for the second task is included or stylized based on a role associated with the user.

6. The method of claim 5 further comprising providing a visual representation of the at least one status element representing state of the second task which takes into account the role associated with the user.

7. The method of claim 5 further comprising providing a visual representation of the at least one status element representing state of the second task which takes into account one or more policies enforcing dependencies between tasks.

8. The method of claim 1 wherein the third view further comprises ownership information for the second task.

9. The method of claim 8 wherein the third view further comprises an action element for one or more actions to be performed with respect to the ownership information for the second task.

10. The method of claim 1 further comprising providing a visual representation of the at least one navigation element of at least one task which takes into account a role associated with the user.

11. The method of claim 1 further comprising providing a visual representation of the at least one navigation element of at least one task in the set of tasks which takes into account whether one or more tasks on which the at least one task depends have been completed.

12. The method of claim 1 wherein the first view further comprises ownership information for each task in the set of tasks.

13. The method of claim 1 wherein the first view further comprises an audit trail element for each task in the set of tasks.

14. The method of claim 1 wherein the first navigation element for the first task or the at least one navigation element for the second task comprises a link.

15. The method of claim 1 wherein generating the first view comprises ordering at least some of the tasks in the set of tasks according to dependency information specifying relationships between tasks in the set of tasks.

16. A non-transitory computer-readable medium storing computer-executable code, the non-transitory computer-readable medium comprising:

code for receiving a selection of a plurality of offerings provided by an enterprise product suite;

code for determining a set of tasks that deploy each offering in the plurality of selected offerings;

code for generating a first view of the set of tasks that deploy at least one of the selected plurality of offerings, the first view comprising at least one navigation element for each task in the set of tasks to complete the task, at least one status element for each task in the set of tasks representing state of the task, and at least one dependency information element for each task in the set of tasks having dependencies, wherein each of the at least one navigation element, the at least one status element, and the at least one dependency information element of each task in the first view is included or stylized based on predetermined criteria applicable to a user or the task;

code for generating a second view of information needed to complete a first task in the set of tasks based on a first interaction of the user with a first navigation element for the first task, the first navigation element determined to be accessible to the user according to the predetermined criteria; and code for generating a third view of dependency information associated with the first task based on a second interaction of the user with a first dependency information element for the first task, the third view comprising an overlay of the first view and a combination of at least one navigation element to complete a second task in the set of tasks, the second task having a relationship with the first task, and at least one status element representing state of the second task, the first dependency information element determined to be accessible to the user according to the predetermined criteria.

17. The non-transitory computer-readable medium of claim 16 wherein the code for generating the first view further code for comprises determining whether the at least one navigation element, the at least one status element, or the at least one dependency information element for each task is included or stylized based on a role associated with the user.

18. The non-transitory computer-readable medium of claim 16 wherein the code for generating the third view further code for comprises code for determining whether the at least one navigation element to complete the second task is included or stylized based on a role associated with the user.

19. The non-transitory computer-readable medium of claim 16 wherein the code for generating the third view further comprises code for providing a visual representation of the at least one status element representing state of the second task which takes into account a role associated with the user or one or more policies enforcing dependencies between tasks.

20. The non-transitory computer-readable medium of claim 16 wherein the code for generating the third view further comprises code for providing an action element for one or more actions to be performed with respect to ownership information provided in the third view for the second task.

21. A system comprising:
a hardware processor; and
a memory storing a set of instructions which when executed by the processor cause the processor to:
receive a selection of a plurality of offerings provided by an enterprise product suite;
determine a set of tasks that deploy each offering in the plurality of selected offerings;
generate a first view of the set of tasks that deploy at least one of the selected plurality of offerings, the first view comprising at least one navigation element for each task in the set of tasks to complete the task, at least one status element for each task in the set of tasks representing state of the task, and at least one dependency information element for each task in the set of tasks having dependencies, wherein each of the at least one navigation element, the at least one status element, and the at least one dependency information element of each task in the first view is included or stylized based on predetermined criteria applicable to a user or the task;
generate a second view of information needed to complete a first task in the set of tasks based on a first interaction of the user with a first navigation element for the first task, the first navigation element determined to be accessible to the user according to the predetermined criteria; and
generate a third view of dependency information associated with the first task based on a second interaction of the user with a first dependency information element for the first task, the third view comprising an overlay of the first view and a combination of at least one navigation element to complete a second task in the set of tasks, the second task having a relationship with the first task, and at least one status element representing state of the second task, the first dependency information element determined to be accessible to the user according to the predetermined criteria.

* * * * *

UNITED STATES PATENT AND TRADEMARK OFFICE
CERTIFICATE OF CORRECTION

| | |
|---|---|
| PATENT NO. | : 9,047,576 B2 |
| APPLICATION NO. | : 12/852719 |
| DATED | : June 2, 2015 |
| INVENTOR(S) | : Schwartz et al. |

It is certified that error appears in the above-identified patent and that said Letters Patent is hereby corrected as shown below:

In the specification

Column 7, line 2, delete "and or/application" and insert -- and/or application --, therefor.

Column 16, line 36, delete "and or" and insert -- and/or --, therefor.

Signed and Sealed this
Sixteenth Day of February, 2016

Michelle K. Lee
*Director of the United States Patent and Trademark Office*